(12) United States Patent
Bessac

(10) Patent No.: US 8,852,375 B2
(45) Date of Patent: Oct. 7, 2014

(54) METHOD FOR PRODUCING A VEHICLE TIRE TREAD

(75) Inventor: Christophe Bessac, Clermont-Ferrand Cedex (FR)

(73) Assignees: Compagnie Generale des Etablissements Michelin, Clermont-Ferrand (FR); Michelin Recherche et Techniques S.A., Grangers-Paccot (CH)

( * ) Notice: Subject to any disclaimer, the term of this patent is extended or adjusted under 35 U.S.C. 154(b) by 90 days.

(21) Appl. No.: 13/697,791

(22) PCT Filed: May 6, 2011

(86) PCT No.: PCT/FR2011/051035
§ 371 (c)(1),
(2), (4) Date: Apr. 5, 2013

(87) PCT Pub. No.: WO2011/141669
PCT Pub. Date: Nov. 17, 2011

(65) Prior Publication Data
US 2013/0236665 A1 Sep. 12, 2013

(30) Foreign Application Priority Data
May 11, 2010 (FR) ...................... 10 53662

(51) Int. Cl.
*B29D 30/52* (2006.01)
*B29C 47/02* (2006.01)
*B60C 11/18* (2006.01)
*B60C 11/14* (2006.01)
*B29C 47/00* (2006.01)

(52) U.S. Cl.
CPC ................ *B29D 30/52* (2013.01); *B60C 11/14* (2013.01); *B29C 47/0019* (2013.01); *B29C 47/027* (2013.01); *B60C 11/18* (2013.01)
USPC .................. 156/244.11; 156/244.24; 156/500

(58) Field of Classification Search
CPC ........ B29D 30/52; B29C 47/02; B60C 11/18; B60C 11/14
USPC ................................ 156/244.11, 244.24, 500
See application file for complete search history.

(56) References Cited

U.S. PATENT DOCUMENTS

| | | |
|---|---|---|
| 1,948,311 A | 2/1934 | Orr |
| 2,439,043 A | 6/1948 | Evan |
| 2,960,138 A | 11/1960 | Chiodo |
| 5,387,303 A | 2/1995 | Azuma |
| 6,951,233 B1 | 10/2005 | Calvar et al. |
| 2008/0105353 A1 | 5/2008 | Losi et al. |

FOREIGN PATENT DOCUMENTS

| | | |
|---|---|---|
| CN | 1771140 | 5/2006 |
| EP | 0 881 060 | 12/1998 |
| GB | 506 142 | 5/1939 |

*Primary Examiner* — Michael C Miggins
(74) *Attorney, Agent, or Firm* — Cozen O'Connor

(57) ABSTRACT

In the process for producing a tread (4) for a vehicle tire: a tread strip made of rubber (4) is extruded; at least one furrow (44) is formed in the tread strip, the tread strip exhibiting material that is contiguous with the furrow; at least one string (8) is supplied from a coil; the string is inserted into the one furrow or each furrow; and the furrow is reclosed over the string using material of the tread strip that is contiguous with the furrow.

17 Claims, 6 Drawing Sheets

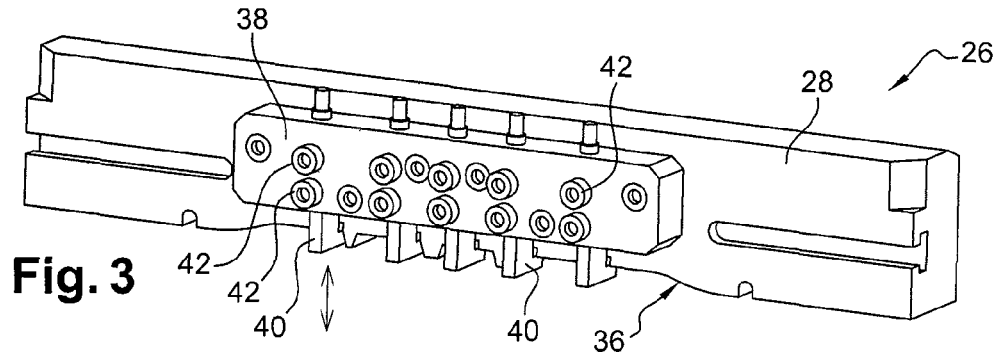
Fig. 3
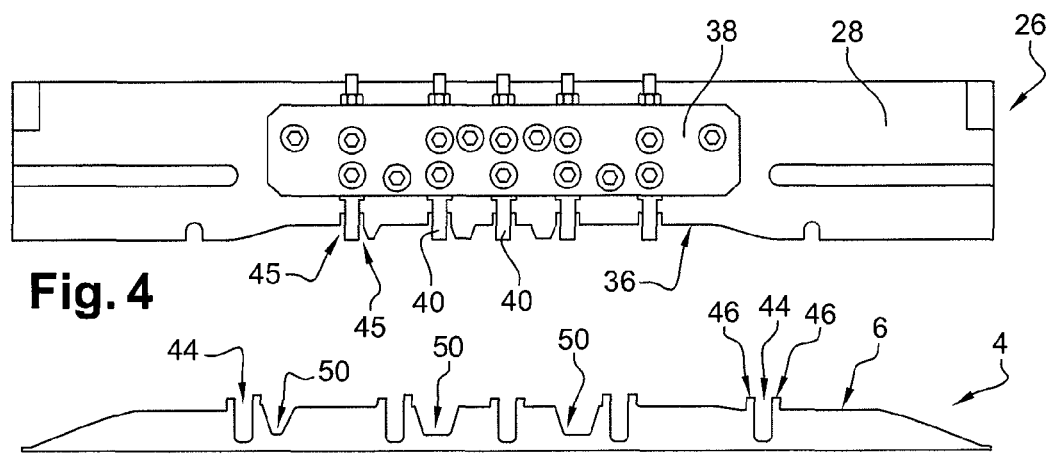
Fig. 4
Fig. 5
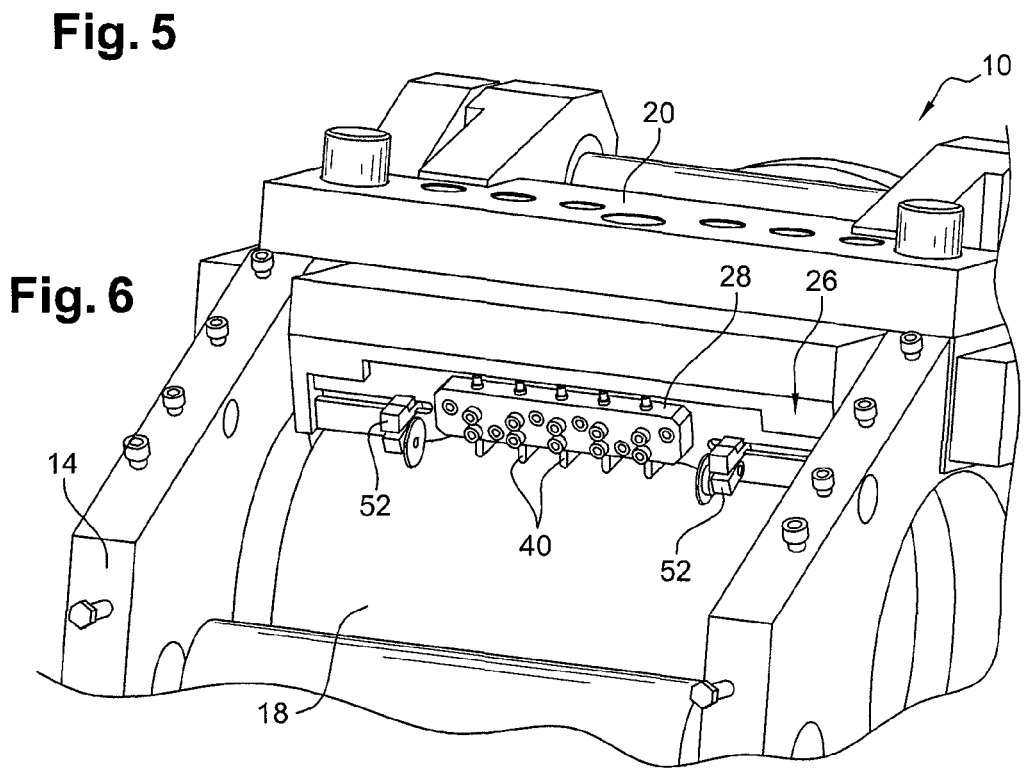
Fig. 6

METHOD FOR PRODUCING A VEHICLE TIRE TREAD

RELATED APPLICATIONS

This is a U.S. National Phase Application under 35 USC 371 of International Application PCT/FR2011/051035 filed on May 6, 2011.

This application claims the priority of French application Ser. No. 10/53662 filed May 11, 2010, the entire content of which is hereby incorporated by reference.

FIELD OF THE INVENTION

The invention relates to the manufacture of vehicle tires and in particular the tread of the tire.

BACKGROUND OF THE INVENTION

Certain special tires comprise a tread formed by a main body made of rubber and by strings or cords embedded in the rubber. The strings are produced in a material exhibiting different mechanical properties than those of the material of the body. These properties permit the strings, at the appropriate time, to compensate for the wear of the tread of the tire and to preserve the mechanical properties of the latter.

According to a first, previously disclosed technique, these special treads are produced together with their strings by coextrusion. The strings and the tread in which they are embedded are thus extruded at the same time.

This technique leads to frequent manufacturing defects, however, which result in waste in the form of complex products of which the material is not readily recoverable.

SUMMARY OF THE INVENTION

One of the objects of the invention is to provide an alternative method and manufacturing process with the potential to improve the manufacturing of treads containing a string embedded in the rubber of the main body.

For this purpose, a process for producing a tread for a vehicle tire is proposed according to one aspect of the invention, in which:

a strip made of rubber is extruded;

at least one furrow is formed in the strip, the strip exhibiting material that is contiguous with the furrow;

at least one string is supplied from a coil;

the string is inserted into the one furrow or each furrow; and the furrow is reclosed over the string using material of the strip that is contiguous with the furrow.

The strings are produced in advance of the formation of the strip made of rubber and separately from the latter. It is thus sufficient to arrange them in the furrow and to reclose the latter. The strings in this case are buried in the rubber after it has been formed. This process limits the quantity of waste due to manufacturing defects because it affords the possibility of dispensing with stabilization stages for the process at the start of each production run. Furthermore, in spite of the fact that the strings are manufactured in advance and separately, they are properly embedded in the rubber.

Preferably, for each section of the strip, the section is extruded and the furrow is formed in the section simultaneously.

In one embodiment, the furrow or at least one of the furrows is formed in such a way that the depth of the furrow varies along the furrow.

For example, the furrow is formed in such a way that the depth of the furrow varies along the furrow in a sinusoidal manner.

Advantageously, the furrow or at least one of the furrows is formed in such a way that the string, after its insertion into the furrow, is level with the surface of the strip.

In one embodiment, at least one relief that is contiguous with the furrow is formed on the strip and, for the one furrow or for each furrow, preferably two reliefs between which the furrow extends.

Advantageously, the furrow is reclosed over the string using material forming the one relief or each relief.

In another embodiment that is compatible with the preceding embodiment, the furrow is reclosed over the string using material of the strip which does not form a relief on the tread strip.

In fact, the uncured rubber is sufficiently soft to permit the furrow to be reclosed without necessarily providing a reserve of material for this purpose in the form of one or a plurality of reliefs.

Another aspect of the invention is directed to a machine for producing a tread for a vehicle tire, which comprises:

means for extruding a strip made of rubber;

means for forming at least one furrow in the strip in such a way that the strip exhibits material that is contiguous with the furrow;

means for accommodating a coil of string;

means for inserting a string originating from the coil into the one furrow or each furrow; and means for reclosing the furrow over the string using material of the strip that is contiguous with the furrow.

The means for forming the furrow are preferably mounted adjustably in such a way as to modify a depth of the furrow.

The depth of the furrows can thus be adapted according to the model of tire that the tread will be used to form. The dimensional accuracy of the furrow, or of each furrow, can thus be improved independently of one another. Finally, it is possible to compensate by this adjustment for the fact that the depth of the furrow would otherwise be insufficient or excessive because of other parameters.

Advantageously, the machine comprises at least one actuator adapted to displace the means for forming the furrow during the formation of the furrow or at least one of the furrows.

The machine preferably comprises a device forming an extrusion orifice and adapted to excavate the one furrow or each furrow.

Advantageously, the device is in a single piece.

It is possible to envisage the means for forming the furrows being arranged in part inside the extrusion orifice.

The means for insertion preferably comprise at least one wheel.

In one embodiment, the machine comprises means for arranging in the furrow material forming at least one relief on the strip that is contiguous with the furrow.

In another embodiment that is compatible with the preceding embodiment, the machine comprises means for arranging in the furrow material of the strip not forming a relief on the strip.

Also proposed according to the invention is a tread for a tire which results from the implementation of the process according to the invention, and an uncured tire blank which comprises such a tread strip.

BRIEF DESCRIPTION OF THE DRAWINGS

FIGS. 3 to 4 are two views respectively in perspective and from the front of the blade of the machine in FIG. 1;

FIG. 5 is a view in cross section of the tread obtained by the passage beneath the blade in FIG. 3;

FIG. 6 is a similar view to FIG. 1 showing the positioning of the blade in FIG. 3 on the machine;

DETAILED DESCRIPTION OF THE INVENTION

A description will now be given, with reference to FIGS. 1 to 14, of a first embodiment of a machine according to the invention, in this particular case being an extrusion machine used for the purpose of producing a tread for use in the manufacture of an uncured vehicle tire blank.

Figure 15:
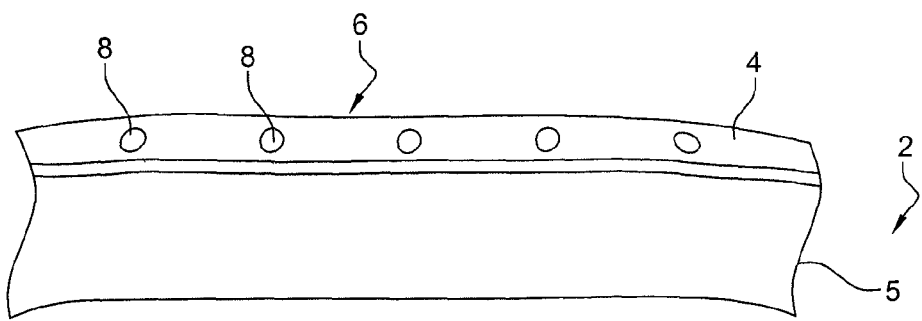
FIG. 15 is a view in cross section of the tread of the tire manufactured by means of the machine.
Figure 16:
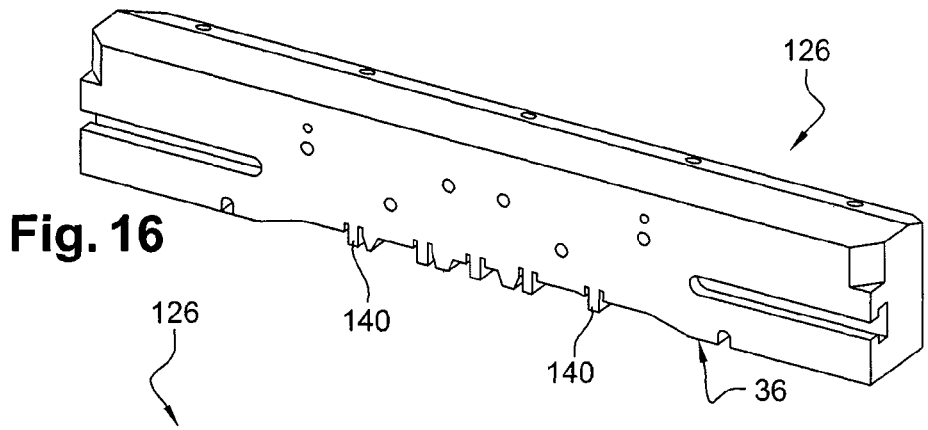
FIGS. 16 to 19 are similar views to FIGS. 3, 4, 6 and 2 respectively showing a second embodiment of the machine according to the invention.
Figure 17:
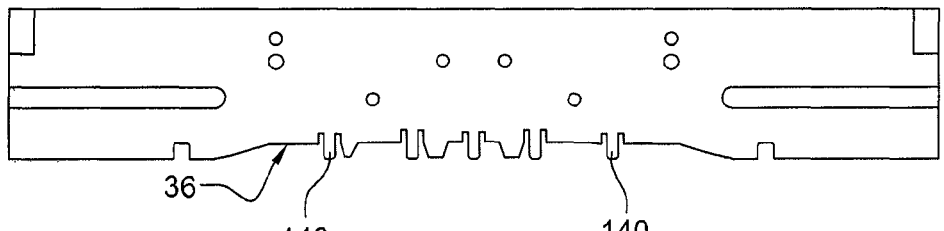
Figure 18:
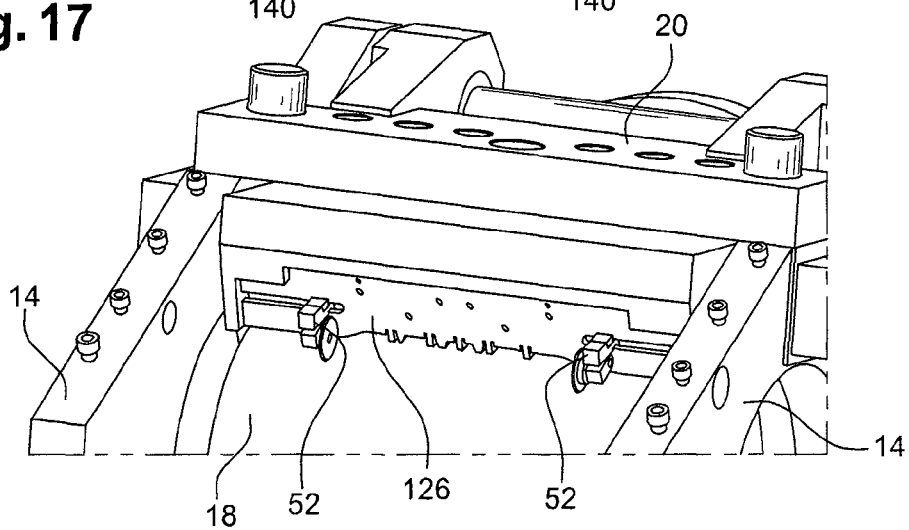
Figure 19:
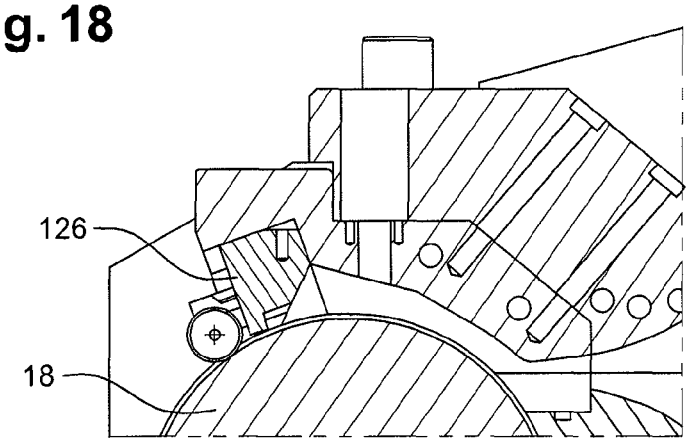

Illustrated in FIG. 15 is a portion of a section through a tire resulting from this manufacturing process after vulcanization of the blank, the section being taken in a radial plane with reference to an axis 3 of the tire. The tread 4 extends around the periphery of the tire between the flanks of the latter and onto its carcass 5, on the periphery of the latter. The tread strip 4 exhibits an external peripheral face 6 forming the surface via which the tire will be in contact with the ground. This face has a generally cylindrical form of circular section.

The tread strip 4 comprises a main body formed from rubber, which conventionally comprises a mixture of natural and synthetic elastomers as well as various products and additives.

The tread strip 4 comprises in addition a plurality of strings or cords 8, being five in number in this particular case, this number being without limitation. Each of the strings is in the form of a wire of circular cross section, as is the case depicted in FIGS. 7, 11 and 15, or of square cross section, as is the case depicted in FIGS. 8 and 12. The strings are embedded in the body and extend at a distance from the two principal external and internal faces of the tread strip. Each string forms a circle that is coaxial with the tire and extends in a plane perpendicular to the axis 3. The strings may have identical or different transverse profiles and may consist of identical or different materials. The strings themselves are not manufactured by means of the machine and according to the process described below. They are produced individually, in advance and separately from the body 5, and they are then wound into coils 9 which are then brought to the machine.

The nose 10 of the extrusion machine includes a frame 12 comprising two vertical uprights 14 of plane form arranged in parallel one with the other, facing one another and at a distance one from the other. Most of the devices of the nose extend into the space provided between the two uprights 14.

Figure 1:
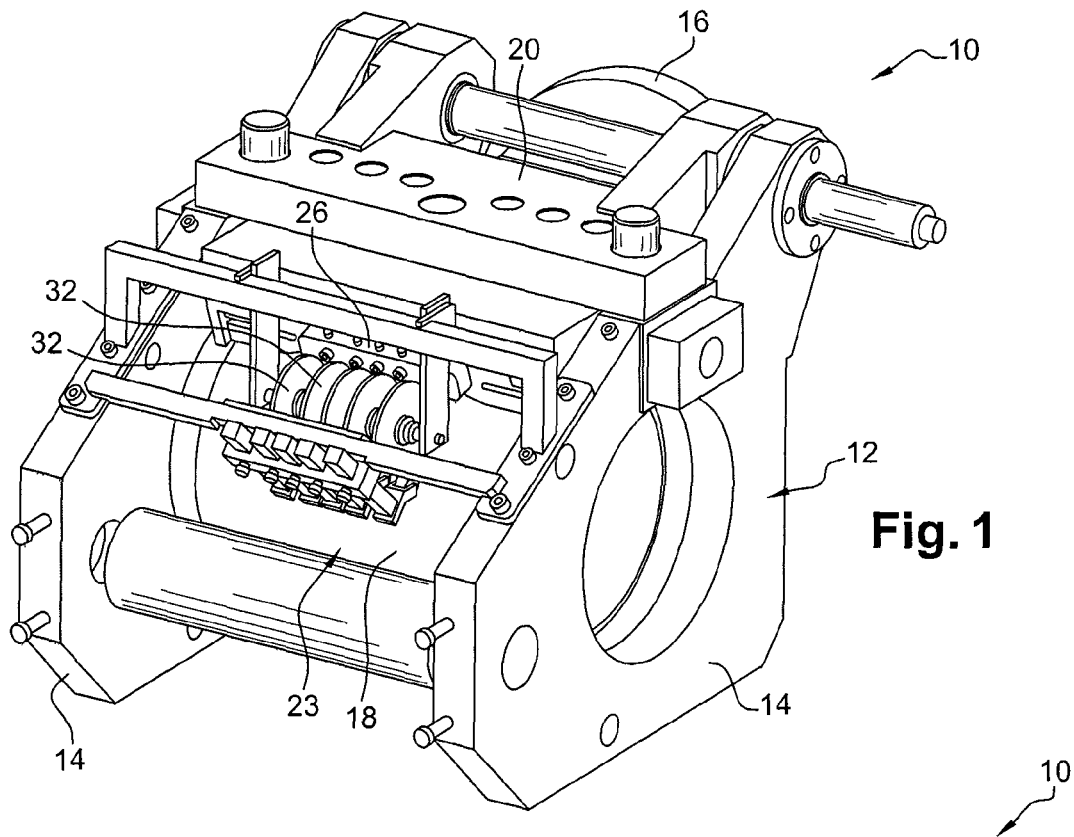
FIGS. 1 and 2 are two views respectively in perspective and in vertical cross section of a nose of a machine according to a first embodiment of the invention.
Figure 2:
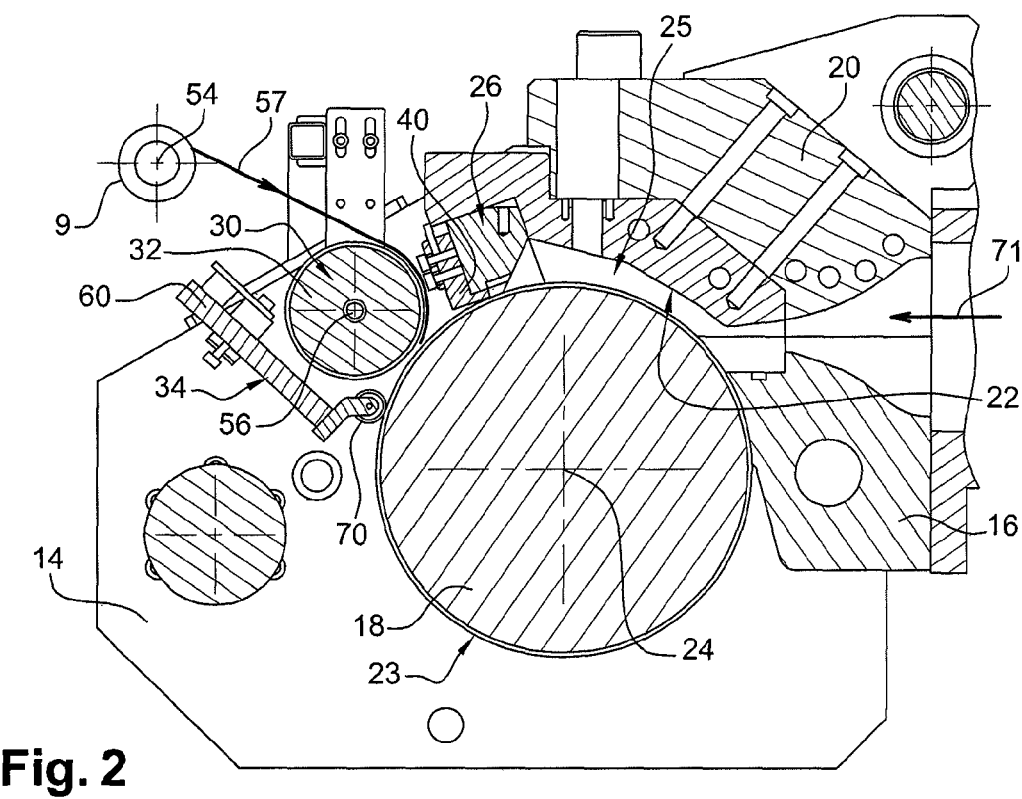

The nose comprises a conduit 16, illustrated in particular in the right-hand part of FIG. 2 and used to supply the rubber intended to be extruded in order to form the body. The nose 10 comprises a cylinder or roller 18 arranged at the downstream mouth of the circuit 16 and exhibiting a cylindrical peripheral face 23 of circular section. The nose comprises in addition an assembly of components 20 forming an arch 22 which, together with the face 23, delimits a chamber 25 for the pressurization of the material to be extruded, into which the conduit 16 discharges. The components 20 are rigidly attached to the frame 12, whereas the roller 18 is rotatably mounted in relation to the uprights 14 about its horizontal axis 24 in the counter clockwise sense in FIG. 2. The nose 10 comprises a profiled blade 26 extending downstream of the chamber 25 and facing towards the face 23 of the roller. Downstream of the blade, the nose comprises an assembly 30 of positioning wheels 32 used for the purpose of introducing the strings into the furrows produced in advance, as well as an assembly of pressure rollers 34 used for the purpose of reclosing the furrows over the strings arranged in this way.

With reference to FIGS. 3 and 4, the profiled blade 26 comprises a main body 28 of elongated form extending from one to the other of the uprights 14 and rigidly attached thereto. The body 28 has a lower face 36 exhibiting cavities and reliefs and intended to give the upper face 6 of the tread its form through the effect of the passage of the rubber between the said face 36 and the face 23 of the roller. These two elements thus form an extrusion orifice which imparts its form to the section of the tread strip 4 at the time of the passage of the material.

The blade 26 comprises in addition a support 38 carrying plowshares 40, their number being the same as the number of strings 8 that the tread strip is intended to receive, this number being five in this particular case. As illustrated in particular in FIG. 2, each of the plowshares 40 exhibits a general "L"-shaped form, with the longest part of the "L" extending in a direction close to the vertical direction and close to the direction radial to the axis 24, and being inserted into a dedicated orifice in the support 38 in which it is mounted so that it is free to slide in the said direction.

For each plowshare 40, the blade 26 comprises rigid means for its attachment to the body 28, which means are formed in this particular case for each plowshare by two attachment screws 42 passing through a part of the support and tightening the plowshare against an internal face of the support. This arrangement permits the adjustment of the position of the plowshare in relation to the body 28 in the aforementioned direction and thus the adjustment of the depth of the furrow 44 produced by the corresponding plowshare in the tread strip 4, for example depending on the model of tire, in the course of the manufacturing process.

The furrows 44 themselves are produced by the penetration of the base or the small side of the "L" of each plowshare 40 into the extruded material forming the tread strip made of rubber. The furrows are produced by the fact that the base of each plowshare projects from the face 36 of the body 28 or, more specifically, from certain zones of this face, as illustrated in FIG. 4. The small side of the "L" is oriented in such a way that the plowshare penetrates beneath the profiled part of the extrusion blade. Thus, the means 40 for forming the furrows are arranged in part inside the extrusion orifice. This particular assembly permits the part upstream of the plowshare to be positioned in a zone where the pressure within the tread strip is not yet zero, which permits the penetration of the plowshare into the material of the tread strip and also the quality of the moulding to be improved.

The face 36 exhibits directly in line with each plowshare a cavity 45 extending beyond the plowshare to either side of the latter. Each of these cavities permits respective beads 46 to be formed in relief on both sides of the furrow forming a surplus of rubber extending beyond the principal part of the face 6. Each furrow thus extends between the two associated beads 46 that are contiguous with it.

Given that the number of furrows in this particular case is equal to five, there are therefore ten beads. The furrows 44 are intended to receive the strings and then to be filled, as further discussed below. The tread strip 36 is also configured to form furrows 50, in this particular case being three in number and intended to remain visible in the tread and in the final tire, unlike the furrows 44. All the aforementioned furrows extend parallel to one other and in the longitudinal direction of the tread strip 4.

As illustrated in FIG. 6, the blade 26 in this particular case also carries two devices 52 forming knives for deburring the material in order to delimit the two opposite lateral edges of the tread strip. These devices are arranged facing one another, to either side of the support 38.

The extrusion machine comprises means 54 for accommodating coils 9, onto which the respective strings are wound. These means are arranged in such a way as to permit the coils to unwind as the manufacturing process progresses.

The assembly 30 comprises wheels 32 which are equal in number, in this particular case, to the number of strings, specifically being five in number. The wheels are mutually identical and are mounted coaxially with one another about a horizontal axis 56. They extend facing towards the blade 26 in such a way that a path 57 of the strings originating from the coils 9 passes between the assembly 30 and the blade 26 prior to their insertion into the tread. In the course of moving along this path, the strings are supported against the peripheral circumferential edge of the respective wheels 32. Each wheel thus serves to guide the corresponding string as far as the base of the furrow in order to deposit it there, the wheel penetrating the interior of the corresponding furrow for this purpose.

The wheels 32 are mounted on a common gantry attached to the frame, the vertical position of which is adjustable in order to cause the wheels to penetrate to a greater or lesser depth into the furrows, and thus to insert the corresponding strings into the latter to a greater or lesser degree. No motorized drive is proposed for the wheels 32 in this particular case, the latter being rotatably driven by the advancing motion of the tread and the strings as they are inserted into the said tread strip at the same peripheral speed as the latter. It is possible to provide an intermediate guide component, such as a tube, that is crossed with regard to its axis by the strings for the purpose of guiding them from the coils 9 as far as the assembly 30.

Figure 7:
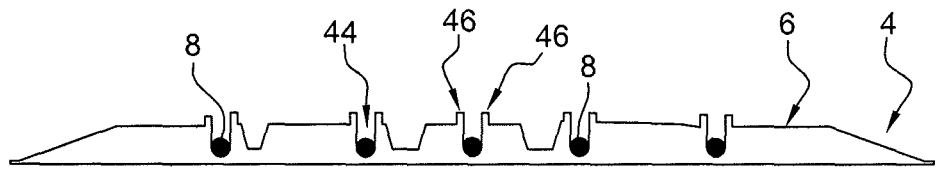
FIGS. 7 and 8 are two similar views to FIG. 5 showing the strings introduced into the furrows on two tread strips of different tires.
Figure 8:
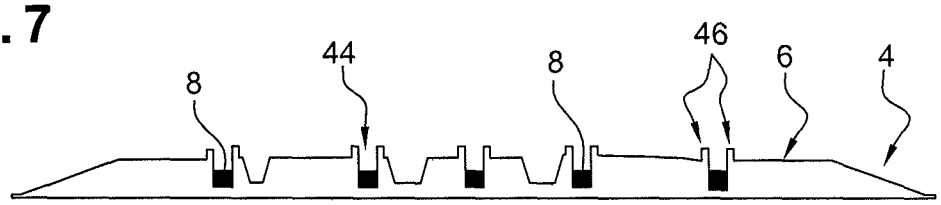
Figure 9:
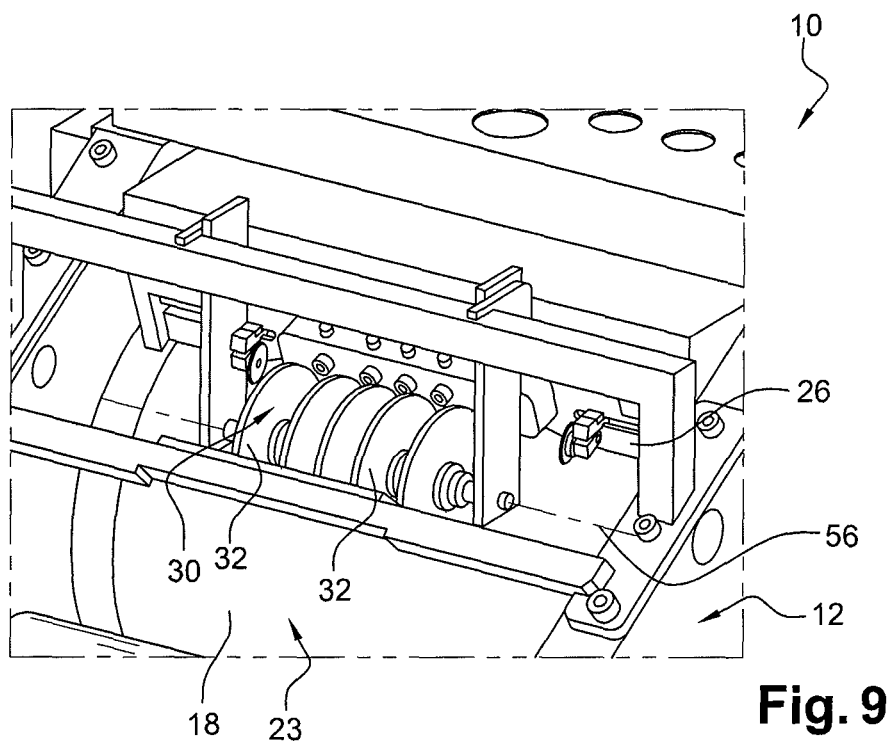
FIG. 9 is a similar view to FIG. 6 showing the devices for guiding the strings into the furrows on the machine.
Figure 10:
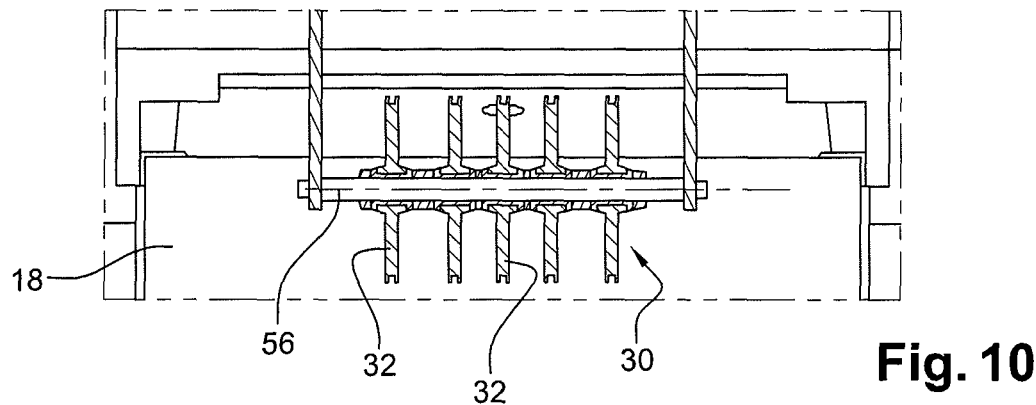
FIG. 10 is a view from above of the part of the machine illustrated in FIG. 9.

FIG. 7 illustrates the tread strip 4 with its open furrows 44, at the base of which the strings 8 have been deposited. The strings in this figure are strings of circular cross section having a diameter of about 4 millimeters. FIG. 8 illustrates in a similar fashion the case of a tread strip 4, arranged in the furrows 44 of which tread strip are strings 8 made of rubber and exhibiting in cross section a parallelepipedic form, for example a square section having a side of 4 millimeters.

Figure 14:
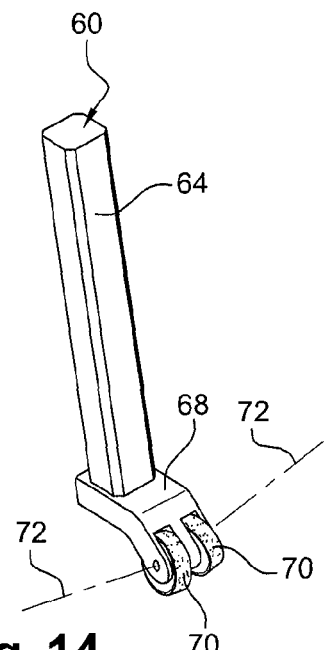
FIG. 14 is a perspective view of one of these devices.

With reference to FIGS. 2 and 11 to 14, the assembly of pressure rollers 34 comprises pressure roller devices of which the number is equal to the number of strings, in this particular case being five in number. One of these devices 60 is illustrated in FIG. 14. The assembly 24 comprises a support 62 rigidly attached to the uprights 14 and extending from one to the other thereof. Each of the devices 60 comprises a mast 64 of profiled form, accommodated inside a corresponding female orifice of the support 62 by being free to slide in the latter in its longitudinal direction which is close to the direction radial to the axis 24. The assembly 34 comprises for each device a tightening element 66 passing through the wall of the support 62 for the purpose of tightening the mast 64 against an internal face of the support and thereby immobilizing the device 60 rigidly in relation to the support 62 in the chosen position of adjustment.

Figure 11:
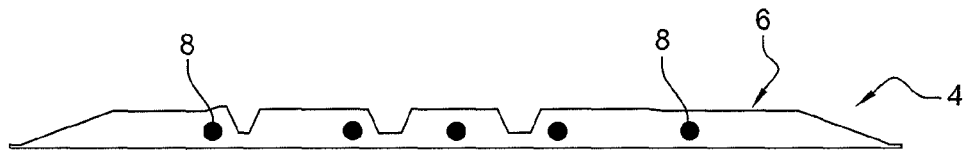
FIGS. 11 and 12 are similar views to FIGS. 7 and 8 showing the section of the tread strip when the furrows have been reclosed.
Figure 12:
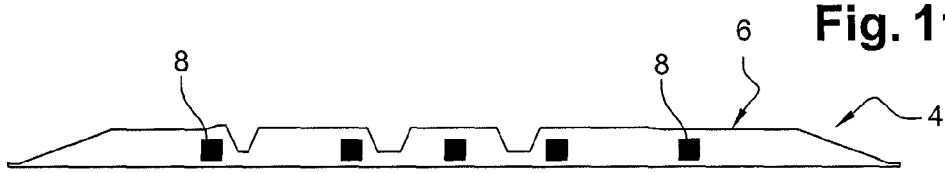
Figure 13:
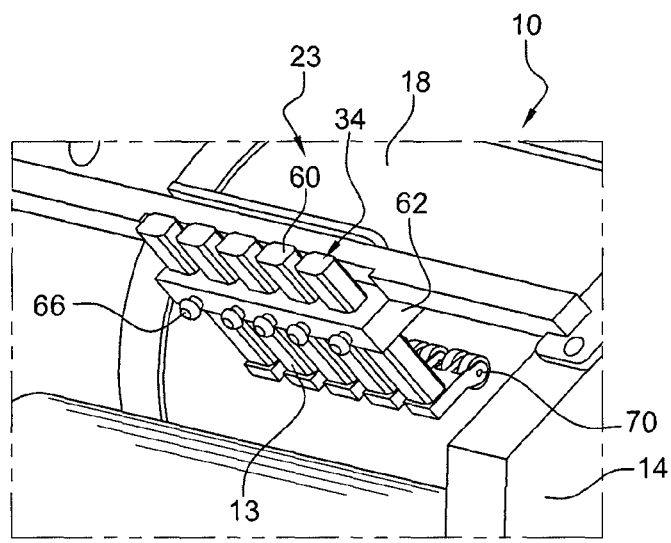
FIG. 13 is a similar view to FIG. 9 showing the filling devices of the machine in FIG. 1.

Each device 60 comprises at a lower extremity of the mast an arm 68 carrying two toothed wheels 70 mounted rotatably on the arm via respective axes of rotation 72, which are coplanar but intersecting and are arranged in such a way that the wheels have an open configuration upstream with reference to the direction of advance of the tread strip. The wheels are arranged in such a way as to be supported on the respective beads 46 associated with the furrow in question in such a way as to fold down the material forming these reliefs into the furrow above the string 8 with a view to filling the furrow 44. The string is thus buried, covered and embedded in the tread, as illustrated in FIGS. 11 and 12 in the two cases corresponding to FIGS. 7 and 8 respectively.

The process of the invention is implemented in the following manner by means of this machine. The material forming the rubber is brought into the nose via the circuit 16 as indicated by the arrow 71, and then passes into the chamber 25 where it is pressurized before being extruded through the extrusion orifice formed by the blade 26 and the roller 18. In the course of this operation, which imparts a form in particular to the upper face 6 of the tread strip, the plowshares 40 produce longitudinal furrows 44 in the face 6, as well as the two beads 46 situated to either side of each furrow. The plowshares are present in the rear part in a zone of the machine where the pressure is reduced in relation to the pressure prevailing inside the chamber 25.

The coils 9 carrying the strings unwind, and the strings are guided and supported by the wheels 32 as they pass between the latter and the blade 26 for the purpose of being inserted into the base of the respective furrows 44 in the thickness of the tread. The strings are unwound from the coils under the effect of the tread strip being drawn along, which also drives the wheels 32. The coil is not braked by any actuator in the course of its movement.

The material forming the tread strip is still warm and soft at this stage. When the tread strip passes beneath the assembly of pressure rollers 34, the wheels 70 fold down the material of the beads 46 into the corresponding furrow, thereby embedding the associated string in the thickness of the tread. The furrow is thus stopped and filled.

These operations take place successively for each section of tread strip concerned. They take place at the same time for the entirety of the tread strip, the tread strips being manufactured in a continuous process.

A second embodiment of the extrusion machine is illustrated in FIGS. 16 to 19. It differs from the preceding embodiment solely in respect of the configuration of the blade and the plowshares. In this case, the plowshares 140 are rigidly attached to the blade 126. In addition, the blade assembly 126 on this occasion is a single component. However, it is the cut-outs in its lower face 36 which at the same time confer its general form to the face 6 of the tread strip and form the furrows 44 and 50 as well as the pairs of beads 46. The ability to adjust the position of each plowshare in relation to the rest of the blade is not available, however. In order to produce another model of the tread, it is necessary to replace the blade 126 with another blade exhibiting different dimensional characteristics. On the other hand, the number of parts that are distinct and mobile in relation to one another is reduced to a minimum in relation to the first embodiment, which avoids the accumulation between the components of extraneous material which is likely to have an adverse effect on their correct positioning and on the quality of the manufacturing process. The profile imparted to the tread strip is identical to that obtained with the first embodiment and the manufacturing process is identical in respect of its other aspects.

Figure 20:
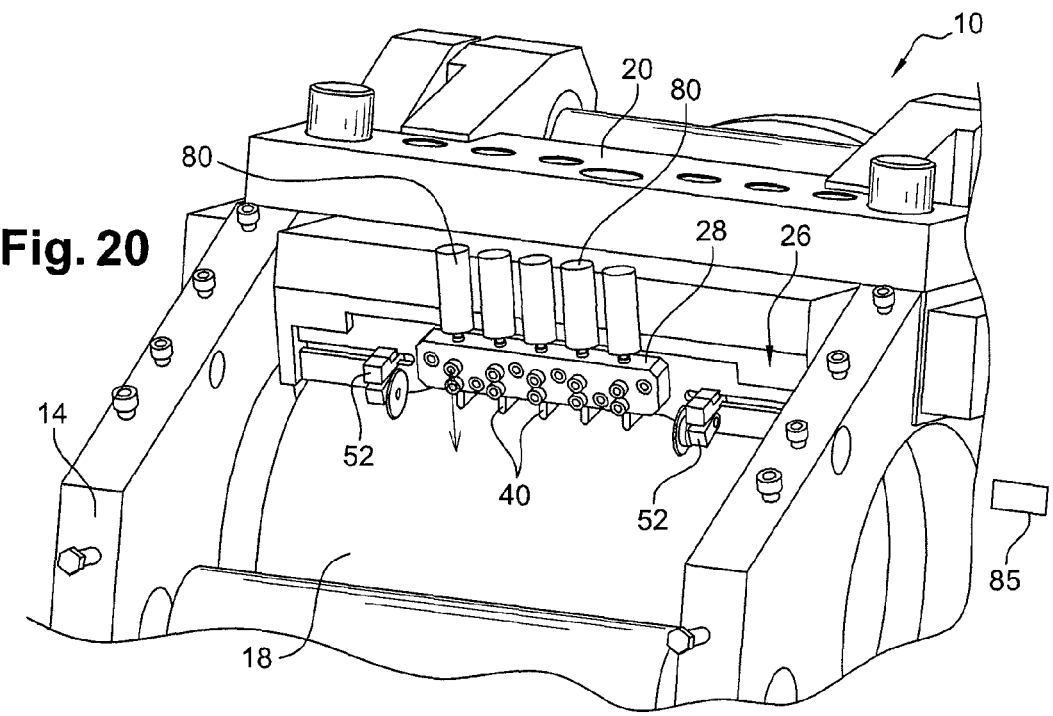
FIG. 20 illustrates a variant embodiment of the machine in FIG. 6.

The variant embodiment of the machine illustrated in FIG. 20 differs from that in FIG. 6 only in respect of the following characteristics.

Figure 21:
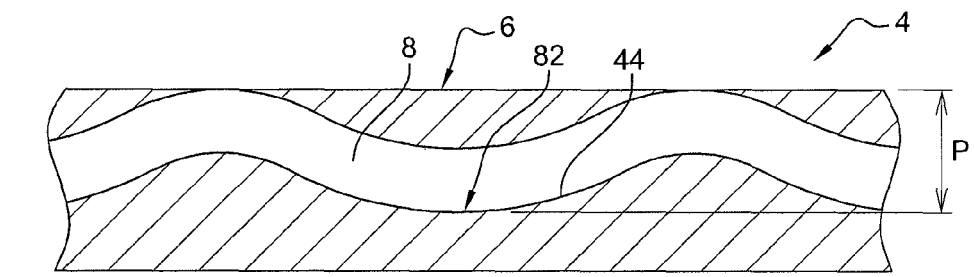
FIG. 21 is a view in longitudinal cross section of a variant of a tread produced by the machine in FIG. 20.

Each of the plowshares 40 is mounted so that it is free to slide in relation to the body 28 in the vertical direction, and the body carries actuators 80, such as rams, connected to the plowshares in a bijective manner and each being adapted to displace the corresponding plowshare in the said direction in relation to the body and during the production of the furrow and the advancing motion of the tread strip. In this way, each plowshare produces a furrow, of which the depth p in relation to the face 6 of the tread strip is not uniform and varies along the furrow and the tread strip. In the example of a finished tread illustrated in FIG. 21, and in which the furrow 44 has thus been reclosed over the string 8, the variation is such that this depth p develops along the furrow according to a sinusoidal distribution, the base 82 of the furrow having a sinusoidal form in cross section according to the median longitudinal plane of the furrow. When the string 8 is installed in the furrow, as illustrated in FIG. 21, and since the string exhibits a section, in this case circular, having a constant dimension along the string, and since it rests on the base of the furrow, its depth in relation to the face 6 of the tread strip also varies, and the string here also adopts a sinusoidal form as seen from the side.

The base and the string can be given a variable depth and form according to a development other than sinusoidal.

In the present example, the dimensions of the furrow and of the string are such that the string is level with the surface of the face 6 of the tread strip. The string nevertheless remains below this face or at the level of the latter for its entire length.

As in the preceding embodiments, control of the machine for the implementation of the process of the invention is assured by means of a controller 85 in the form of one or a plurality of computers equipped with a microprocessor and a memory. These means comprise one or a plurality of programs in recorded form comprising instructions that are coded and adapted for controlling the implementation of all or part of the process when they are executed on the computer. These means of control and this program assure in particular the management of the actuators 80, independently of one another, in order to vary the depth of the furrows during manufacturing of the tread strip. Provision can be made in particular for the furrows to exhibit identical depths in one and the same section of the tread strip perpendicular to its longitudinal direction or, on the contrary, different depths. For example, in at least one section, the depth of one of the furrows has a maximum value (by comparison with other parts of the same furrow), whereas the depth of another furrow has a minimum value (by comparison with other parts of this other furrow).

Figure 22:
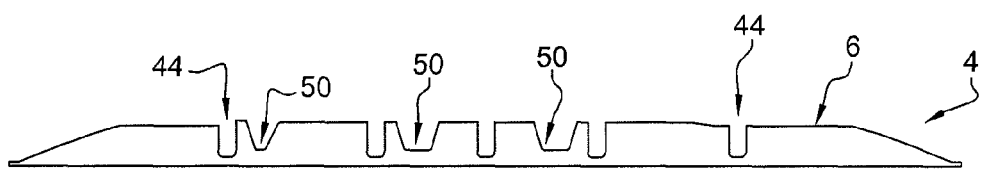
FIG. 22 illustrates a variant of the tread in FIG. 5 produced by a variant embodiment of the process of the invention.

Another variant embodiment of the implementation of the process is illustrated in FIG. 22. This differs from the mode of implementation of the process associated with FIG. 5 in the fact that no relief projecting beyond the face 6 is produced on the tread strip. Then, in order to reclose each furrow 44 over the string 8, the wheels 70 cause the material of the tread strip contiguous with the furrow to flow and to form in particular an upper part of the flanks of the furrow. Accordingly, the furrow is reclosed over the string using material of the tread strip not forming a relief on the tread strip.

The tires obtained by means of the invention are intended in particular for fitment to the wheels of vehicles of the light goods, van or heavy goods types.

It should be noted here that the invention may be implemented in a simple manner by adapting a conventional extruder, of the flat-nose type, or even an extruder containing coextrusion channels, that is to say by equipping it with means for producing furrows, with means for the supply of the strings and their insertion into the furrows and with means for filling the furrows.

Numerous modifications can be made to the invention without departing from the scope of the invention.

The invention claimed is:

1. Process for producing a tread for a vehicle tire, comprising the steps of:
   extruding a strip made of rubber;
   forming at least one furrow in the strip, the strip exhibiting material that is contiguous with the furrow;
   supplying at least one string is supplied from a coil;
   inserting the string into the one furrow or each furrow; and
   reclosing the furrow over the string using material of the strip that is contiguous with the furrow.

2. The process according to claim 1, wherein, for each section of the strip, the section is extruded and the furrow is formed in the section simultaneously.

3. The process according to claim 1, wherein the furrow is reclosed over the string using material of the strip which does not form a relief on the strip.

4. The process according to claim 1, wherein the furrow or at least one of the furrows is formed in such a way that a depth (p) of the furrow varies along the furrow.

5. The process according to claim 4, wherein the furrow is formed in such a way that the depth (p) of the furrow varies along the furrow in a sinusoidal manner.

6. The process according to claim 4, wherein the furrow or at least one of the furrows is formed in such a way that the string, after its insertion into the furrow, is level with the surface of the strip.

7. The process according to claim 1, wherein at least one relief that is contiguous with the furrow is formed on the strip and, for the one furrow or for each furrow, preferably two reliefs between which the furrow extends.

8. The process according to claim 7, wherein the furrow is reclosed over the string using material forming the one relief or each relief.

9. A machine for producing a tread for a vehicle tire, comprising:
   means for extruding a strip made of rubber;
   means for forming at least one furrow in the strip in such a way that the strip exhibits material that is contiguous with the furrow;
   means for accommodating a coil of string;
   means for inserting a string originating from the coil into the one furrow or each furrow; and
   means for reclosing the furrow over the string using material of the strip that is contiguous with the furrow.

10. The machine according to claim 9, wherein the means for forming the furrow are mounted adjustably in such a way as to modify a depth of the furrow.

11. The machine according to claim 9, which comprises at least one actuator adapted to displace the means for forming the furrow during the formation of the furrow or at least one of the furrows.

12. The machine according to claim 9, wherein the means of insertion comprise at least one wheel.

13. The machine according to claim 9, which comprises means for arranging in the furrow material forming at least one relief on the strip that is contiguous with the furrow.

14. The machine according to claim 9, which comprises means for arranging in the furrow material of the strip not forming a relief on the strip.

15. The machine according to claim 9, which comprises a device forming an extrusion orifice and adapted to excavate the one furrow or each furrow.

16. The machine according to claim 15, wherein the device is in a single piece.

17. The machine according to claim 15, wherein the means for forming the furrows are arranged in part inside the extrusion orifice.

\* \* \* \* \*

UNITED STATES PATENT AND TRADEMARK OFFICE
CERTIFICATE OF CORRECTION

PATENT NO.        : 8,852,375 B2
APPLICATION NO.   : 13/697791
DATED             : October 7, 2014
INVENTOR(S)       : Christophe Bessac It is certified that error appears in the above-identified patent and that said Letters Patent is hereby corrected as shown below:

On the title page item 73 should read

Assignees: Compagnie Generale des Etablissements Michelin, Clermont-Ferrand (FR); Michelin Recherche et Technique S.A., Granges-Paccot (CH)

Signed and Sealed this
Twenty-third Day of February, 2016

Michelle K. Lee
*Director of the United States Patent and Trademark Office*